(12) United States Patent
Huang et al.

(10) Patent No.: US 11,007,715 B2
(45) Date of Patent: May 18, 2021

(54) 3D PRINT HEAD WITH NOZZLES CAPABLE OF RAISING AND LOWERING

(71) Applicants: XYZPRINTING, INC., New Taipei (TW); KINPO ELECTRONICS, INC., New Taipei (TW)

(72) Inventors: Shih-Wei Huang, New Taipei (TW); Chien-Chih Chen, New Taipei (TW); Yang-Teh Lee, New Taipei (TW)

(73) Assignees: XYZPRINTING, INC., New Taipei (TW); KINPO ELECTRONICS, INC., New Taipei (TW)

( * ) Notice: Subject to any disclaimer, the term of this patent is extended or adjusted under 35 U.S.C. 154(b) by 34 days.

(21) Appl. No.: 16/732,533

(22) Filed: Jan. 2, 2020

(65) Prior Publication Data
US 2021/0078246 A1  Mar. 18, 2021

(30) Foreign Application Priority Data
Sep. 17, 2019 (CN) .......................... 201910876000.0

(51) Int. Cl.
*B29C 64/209*  (2017.01)
*B33Y 30/00*  (2015.01)

(52) U.S. Cl.
CPC ............ *B29C 64/209* (2017.08); *B33Y 30/00* (2014.12)

(58) Field of Classification Search
CPC ... B29C 64/106; B29C 64/118; B29C 64/209; B33Y 30/00
See application file for complete search history.

(56) References Cited

U.S. PATENT DOCUMENTS

| 5,503,785 A | * | 4/1996 | Crump | B33Y 40/00 264/40.7 |
| 2007/0228590 A1 | * | 10/2007 | LaBossiere | B33Y 30/00 264/40.1 |

(Continued)

FOREIGN PATENT DOCUMENTS

| CN | 204431740 U | | 7/2015 |
| CN | 105291436 | * | 2/2016 |

(Continued)

OTHER PUBLICATIONS

Office Action dated Dec. 21, 2020 of the corresponding Korean patent application No. 10-2020-0000066.

(Continued)

*Primary Examiner* — Joseph S Del Sole
*Assistant Examiner* — Manley L Cummins, IV
(74) *Attorney, Agent, or Firm* — Chun-Ming Shih; HDLS IPR Services

(57) ABSTRACT

A 3D print head includes a carrier connected with a horizontal slide rail, a pair of nozzle assemblies disposed on the carrier, a swing arm and a push rod. Each nozzle assembly includes a nozzle and an elastic member, and movably coupled to the carrier and capable of raising and lowering relative to the carrier. Each elastic member is connected between the carrier and the corresponding nozzle to raise the nozzle relative to the carrier. The swing arm is pivoted to the carrier, and one end there of can be moved between the nozzles to push one of the nozzles down. The push rod is extended from the swing arm. While the carrier moving along the horizontal slide rail, the push rod can be pushed to rotate the swing arm to push the print nozzle down, thus the product can be prevented from scratching by another idle nozzle while printing.

11 Claims, 8 Drawing Sheets

(56) References Cited

U.S. PATENT DOCUMENTS

| | | | | |
|---|---|---|---|---|
| 2009/0035405 A1* | 2/2009 | Leavitt | ............... | B29C 48/08 |
| | | | | 425/97 |
| 2014/0242208 A1* | 8/2014 | Elsworthy | ............ | B29C 31/042 |
| | | | | 425/375 |
| 2015/0290861 A1* | 10/2015 | Douglass | ............... | B33Y 30/00 |
| | | | | 264/255 |
| 2019/0084228 A1* | 3/2019 | Chen | ............... | B29C 64/118 |
| 2021/0060859 A1* | 3/2021 | Li | ............... | B29C 64/227 |

FOREIGN PATENT DOCUMENTS

| | | | |
|---|---|---|---|
| CN | 105291436 A | | 2/2016 |
| CN | 106217880 | * | 12/2016 |
| CN | 106217880 A | | 12/2016 |
| CN | 207682959 U | | 8/2018 |
| KR | 20150102244 A | | 9/2015 |
| KR | 20180068406 A | | 6/2018 |
| KR | 101953789 B1 | | 5/2019 |
| TW | 201914802 A | | 4/2019 |

OTHER PUBLICATIONS

Office Action dated Feb. 5, 2020 of the corresponding Taiwan patent applicaiton.

* cited by examiner

3D PRINT HEAD WITH NOZZLES CAPABLE OF RAISING AND LOWERING

BACKGROUND OF THE INVENTION

Field of the Invention

The technical field relates to a 3D print device, and in particular, to a 3D print head with dual nozzles capable of raising and lowering.

Description of Prior Art

The disclosure is directed to a 3D printing device, and in particular, to a 3D printing device in a type of a Fused Deposition Modeling (FDM) which melts plastics filament by a heated nozzle and then extrudes it at a predetermined position, and the extruded plastics will be cooled for solidifying. In addition, the print head of the current FDM printing device is provided with dual nozzles for printing different colors of plastic. When printing, the dual nozzles are moved with the print head at the same time. Therefore, when one of the nozzles is printing, the finished product will be scratched by the idle nozzle which is passing.

In view of the above drawbacks, the Inventor proposes the disclosed example based on his expert knowledge and elaborate researches in order to solve the problems of prior art.

SUMMARY OF THE INVENTION

The present invention provides a 3D print head with nozzles capable of raising and lowering.

One of the exemplary embodiments, the disclosure is directed to a 3D print head with nozzles capable of raising and lowering, which is disposed on a horizontal slide rail and has an interference structure corresponding to each of two ends of the horizontal slide rail. The 3D print head with nozzles capable of raising and lowering comprises a carrier, a pair of nozzle assemblies, a swing arm and a push rod. The carrier is connected with the horizontal slide rail. The nozzle assemblies are disposed on the carrier, and each of the nozzle assemblies includes a nozzle and an elastic member separately. Each nozzle assembly is movably coupled to the carrier and capable of raising and lowering with respect to the carrier, and each elastic member is connected between the carrier and the corresponding nozzle, so that the nozzles can be raised with respect to the carrier separately. The swing arm is pivotally connected to the carrier. The swing arm swings so that one end of the swing arm can be moved between the pair of nozzles and capable of selectively pushing one of the nozzles down. The push rod is extended from the swing arm and disposed corresponding to the interference structure. The carrier is capable of moving along the horizontal slide rail such that the push rod is selectively pushed by one of the interference structures to rotate the swing arm.

In the 3D print head with nozzles capable of raising and lowering according to the present disclosure, a pivot point of the swing arm and the carrier is located between the pair of nozzles.

In the 3D print head with nozzles capable of raising and lowering according to the present disclosure, a positioning elastic member is connected between the swing arm and the carrier, and the positioning elastic member drives the swing arm to press and position the descending nozzle; the positioning elastic member swings with the swing arm, and the positioning elastic member and the carrier has a connection point located between the pair of nozzles.

In the 3D print head with nozzles capable of raising and lowering according to the present disclosure, the carrier includes a housing and a frame accommodated in the housing; the pair of nozzle assemblies are accommodated in the housing, and the pair of nozzles are movably coupled to the frame; the push rod extends out the housing; the carrier is provided with a positioning hole, and the positioning hole is a through hole or a tapered hole corresponding to the nozzle which has a shape tapered downwardly; the housing is exposed through the positioning hole when the nozzle is lowered; a lower tip of the nozzle is positioned against an inner edge of the positioning hole.

In the 3D print head with nozzles capable of raising and lowering according to the present disclosure, each of the nozzles is provided with a pressing plate, and an edge of the pressing plate forms a slope surface, and the swing arm can be moved to the corresponding pressing plate by any one of the slope surfaces to press the corresponding nozzle; a quantity of the swing arms is plural, and the swing arms coaxially rotate with each other; the push rod extends from one of the swing arms; a guide wheel is pivoted at the swing arm for selectively pushing one of the nozzles.

In the 3D print head with nozzles capable of raising and lowering according to the present disclosure, a pair of protruding portions are protruded laterally at two sides of the push rod corresponding to the interference structures.

One of the exemplary embodiments, when the 3D print head moves, the swing arm can be pushed by the push rod colliding with the interference structure, thereby the nozzle of using will be pushed down for printing. Therefore, the nozzle can be raised or lowered by a simple structure to generate a height difference between the two nozzles, so that the finished product will not be scratched by the idle nozzle at the time of printing

BRIEF DESCRIPTION OF DRAWINGS

The features of the invention believed to be novel are set forth with particularity in the appended claims. The invention itself, however, may be best understood by reference to the following detailed description of the invention, which describes a number of exemplary embodiments of the invention, taken in conjunction with the accompanying drawings, in which:

DETAILED DESCRIPTION OF THE PREFERRED EMBODIMENTS

Figure 1:
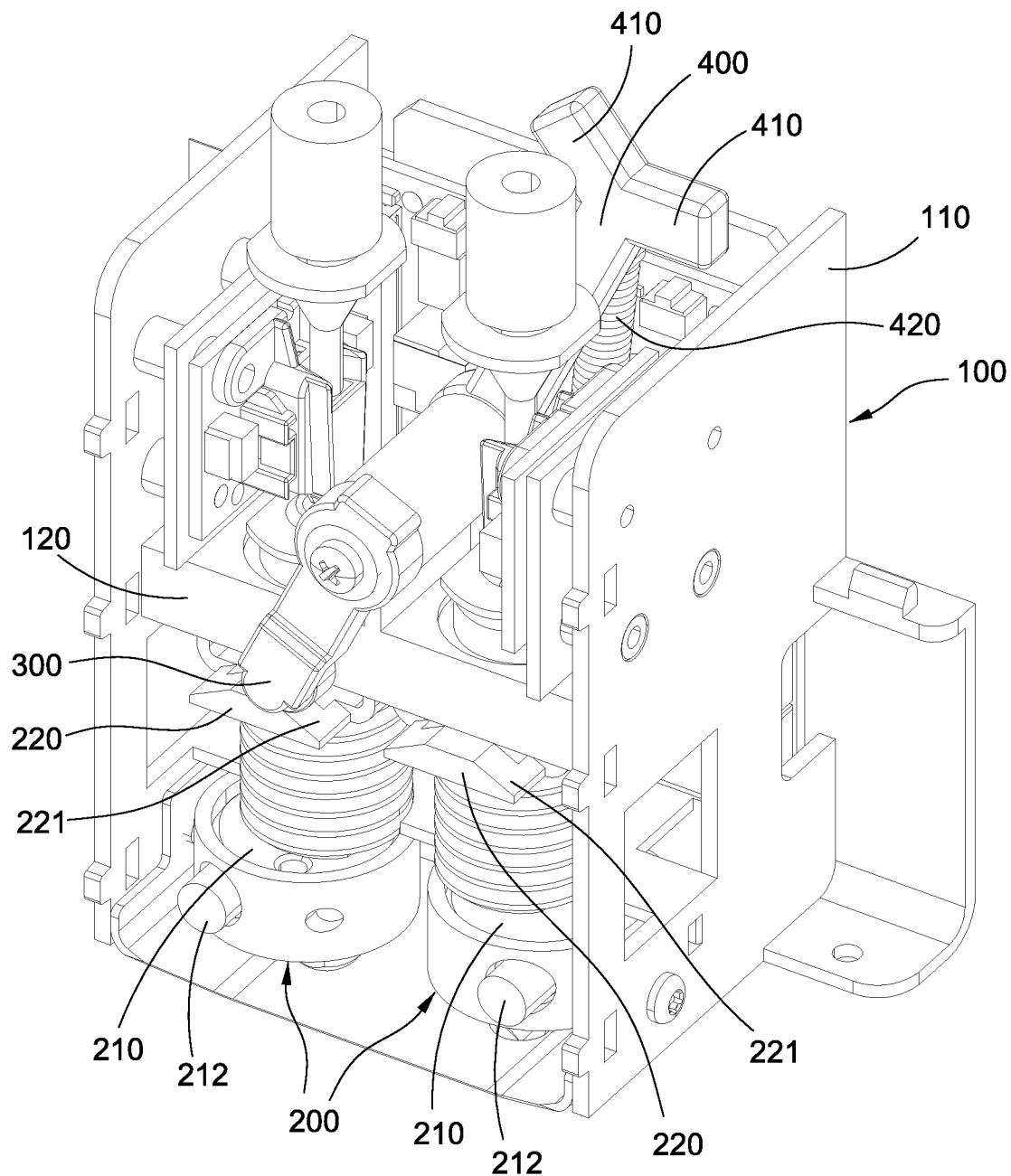
FIG. 1 is a perspective schematic view illustrating a 3D print head with nozzles capable of raising and lowering according to the present disclosed example.

In cooperation with attached drawings, the technical contents and detailed description of the invention are described thereinafter according to a number of preferable embodiments, being not used to limit its executing scope. Any equivalent variation and modification made according to appended claims is all covered by the claims claimed by the present invention.

Please refer to FIG. 1 to FIG. 6. A preferred embodiment of the present disclosed example provides a 3D print head with nozzles capable of raising and lowering, which is disposed on a horizontal slide rail 10 and has interference structures 11a/11b corresponding to two ends of the horizontal slide rail 10 respectively. In the present embodiment, the interference structures 11a/11b are disposed above the horizontal slide rail 10 and configured corresponding to two ends of the horizontal slide rail 10.

In the present embodiment, the 3D print head with nozzles capable of raising and lowering at least comprises one carrier 100, a pair of nozzle assemblies 200, a swing arm 300 and a push rod 400.

The carrier 100 is connected with the horizontal slide rail 10, so that the 3D print head with nozzles capable of raising and lowering of the present disclosed example can be able to slide horizontally along the horizontal slide rail 10. Specifically, the carrier 100 at least includes a housing 110 and a frame 120 accommodated in the housing 110. In the present embodiment, the frame 120 is made pf plastic, and the housing 110 is composed, but not limited to, by bending a metal sheet. One side of the housing 110 is connected to the horizontal slide rail 10, specifically, the housing 110 can be indirectly connected to the horizontal slide rail 10 by a plastic member according to the actual configuration.

The nozzle assemblies 200 are accommodated in the housing 110, and the nozzle assemblies 200 are disposed on the carrier 100. Each of the nozzle assemblies 200 includes a nozzle 210 and an elastic member 201 separately. Each nozzle assembly 210 is movably coupled to the carrier 100 and is capable of raising and lowering with respect to the carrier 100. The pair of nozzles 210 are movably coupled to the frame 120. Specifically, each of the nozzles 210 has a feeding tube 211, and the top end of the feeding tube 211 passes vertically through the frame 120 movably. The lower end of the feeding tube 211 is provided with a heater 212 for melting the filament input from the feeding tube 211, and the molten filament is extruded downwardly through the lower end of the feeding tube 211. Each of the elastic members 201 is connected between the carrier 100 and the corresponding nozzle 210, so that each nozzle 210 can be lifted with respect to the carrier 100. In the present embodiment, each elastic member 201 is a cylindrical spring that is sleeved at the top end of each feeding tube 211. Besides, the lower end of each elastic members 201 abuts against the top surface of the frame 120.

The swing arm 300 is pivotally connected to the carrier 100. The swing arm 300 swings so that one end of the swing arm 300 can be moved between the pair of nozzles 210 and capable of selectively pushing one of the nozzles 210 down. In an embodiment, a pivot point of the swing arm 300 and the carrier 100 is located between the pair of nozzles 210, and a guide wheel 310 is pivoted at a lower end of the swing arm 300 in order to facilitate moving the top surface of the nozzle 210 from the side of the nozzle 210 along the surface of the nozzle 210, so that the nozzle 210 can be pushed down further.

Please refer to FIG. 2 to FIG. 6. The push rod 400 extends from the swing arm 300 and are disposed corresponding to the interference structures 11a/11b. The push rod 400 extends out the housing 110; besides, a pair of protruding portions 410 are protruded laterally at two sides of the push rod 400 corresponding to the interference structures 11a/11b. In the embodiment, the pair of protruding portions 410 are branched in a Y shape and protruded at two sides of the top end of the push rod 400 respectively. In addition, one of the protruding portions 410 is horizontally extended when the push rod 400 is at the two ends of the stroke of swinging. The protruding portions 410 collides with the interference structure 11a/11b such that the interference structure 11a/11b will be easier to push the push rod 400.

Figure 7:
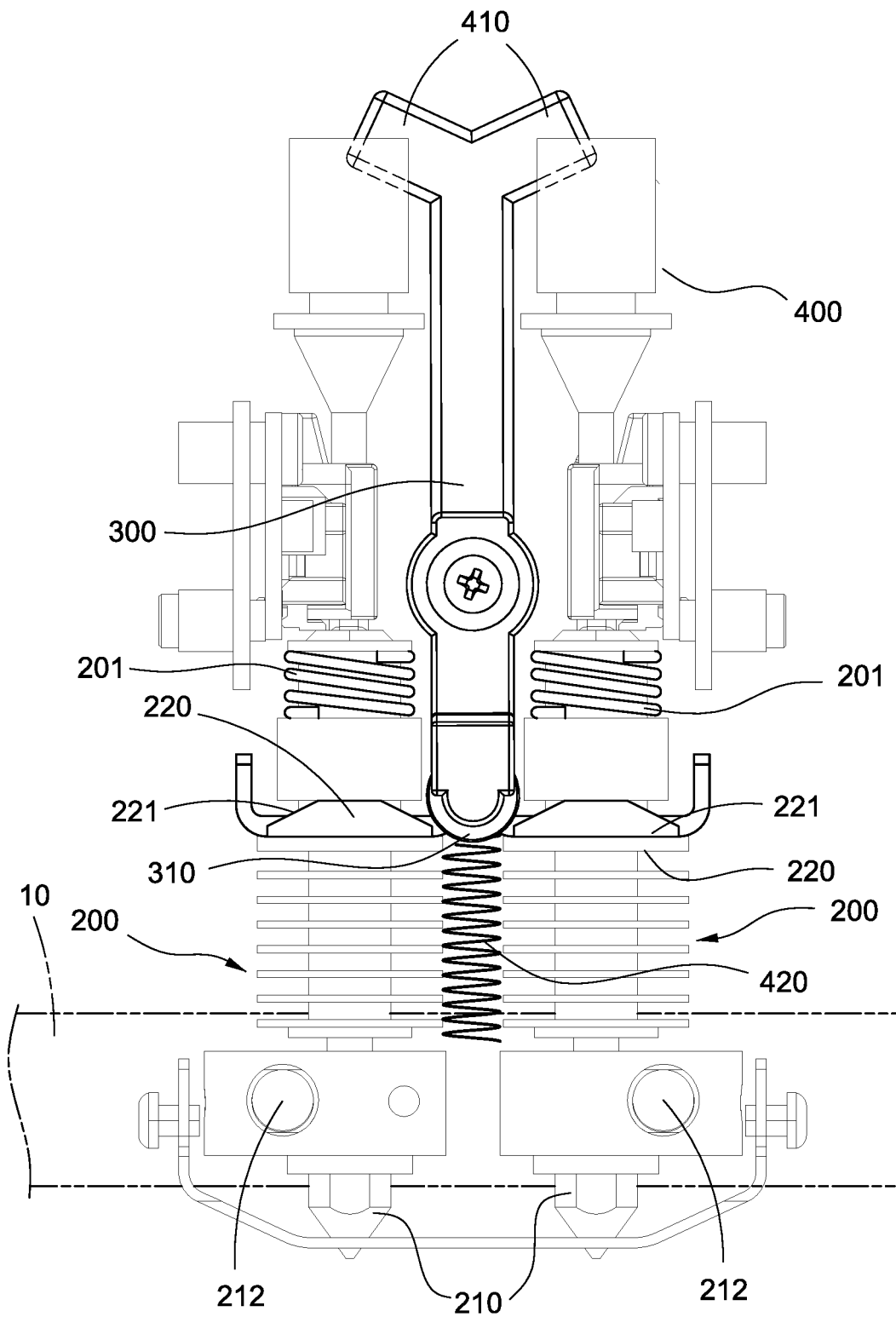

The carrier 100 is capable of moving along the horizontal slide rail 10 such that the push rod 400 is selectively pushed by one of the interference structures 11a/11b to rotate the swing arm 300, so that the corresponding nozzle 210 will be pushed down. Furthermore, a positioning elastic member 420 is connected between the swing arm 300 and the carrier 100, and the positioning elastic member 420 drives the swing arm 300 to press and position the descending nozzle 210. Specifically, in the present embodiment, the positioning elastic member 420 is a long coil spring. The lower end of the positioning elastic member 420 is connected to the carrier 100, and the upper end of the positioning elastic member 420 is connected to the swing arm 300 and swings with the swing arm 300. The positioning elastic member 420 swings with the swing arm 300, and the positioning elastic member 420 and the carrier 100 has a connection point located between the pair of nozzles 210. Therefore, regardless of the swing arm 300 swings to any of its bidirectional strokes, the positioning elastic member 420 can press the swing arm 300 by its restoring force. In an embodiment, when the printing is finished, the moving of the swing arm 300 will be located selectively between the pair of nozzles 210 as shown in FIG. 7, so that the nozzles 210 of 3D print head capable of raising and lowering are all raised upwardly to facilitate retreating from the finished product.

Figure 5:
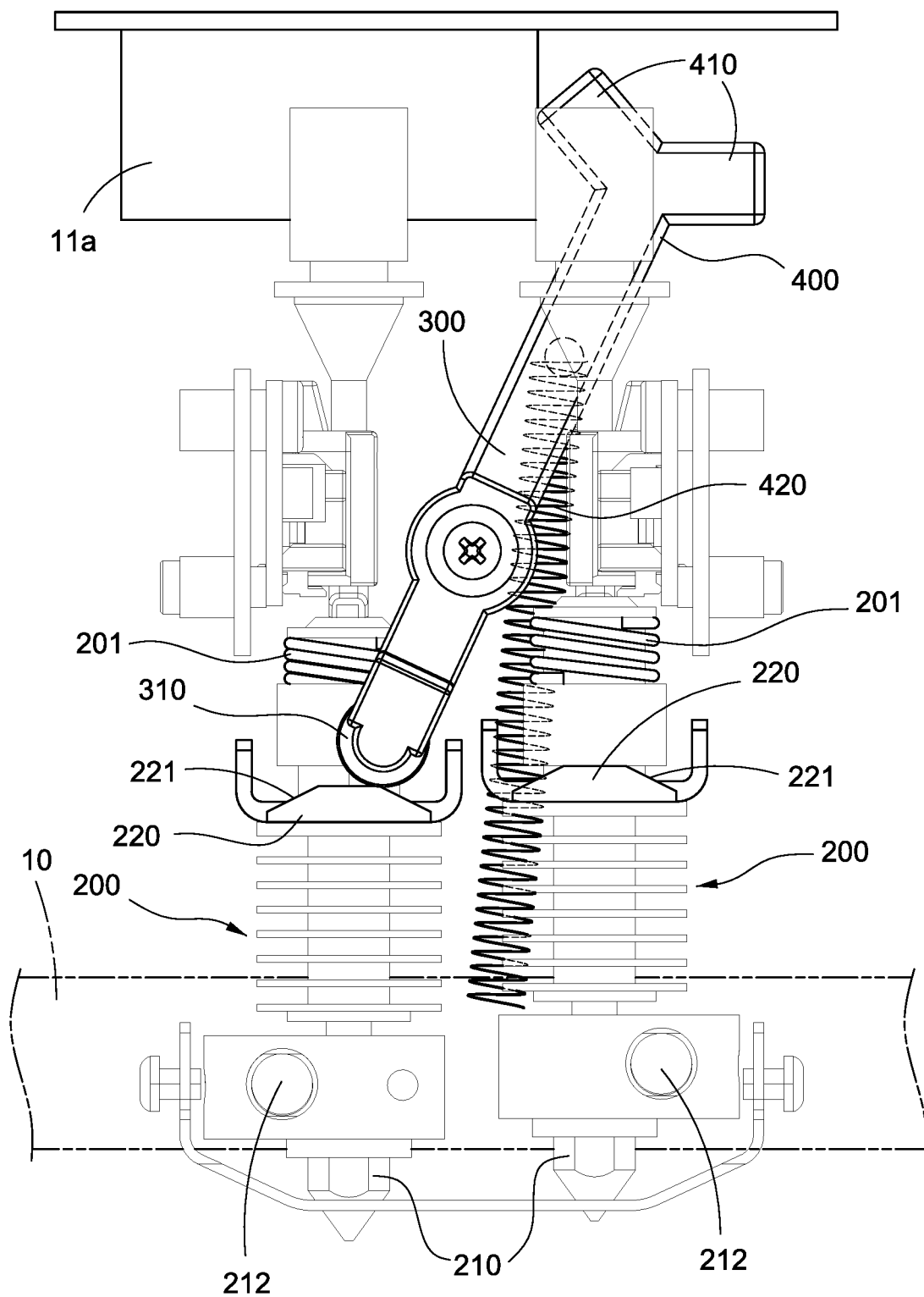
FIG. 5 to FIG. 7 are operation schematic views illustrating a 3D print head with nozzles capable of raising and lowering according to the present disclosed example.
Figure 6:
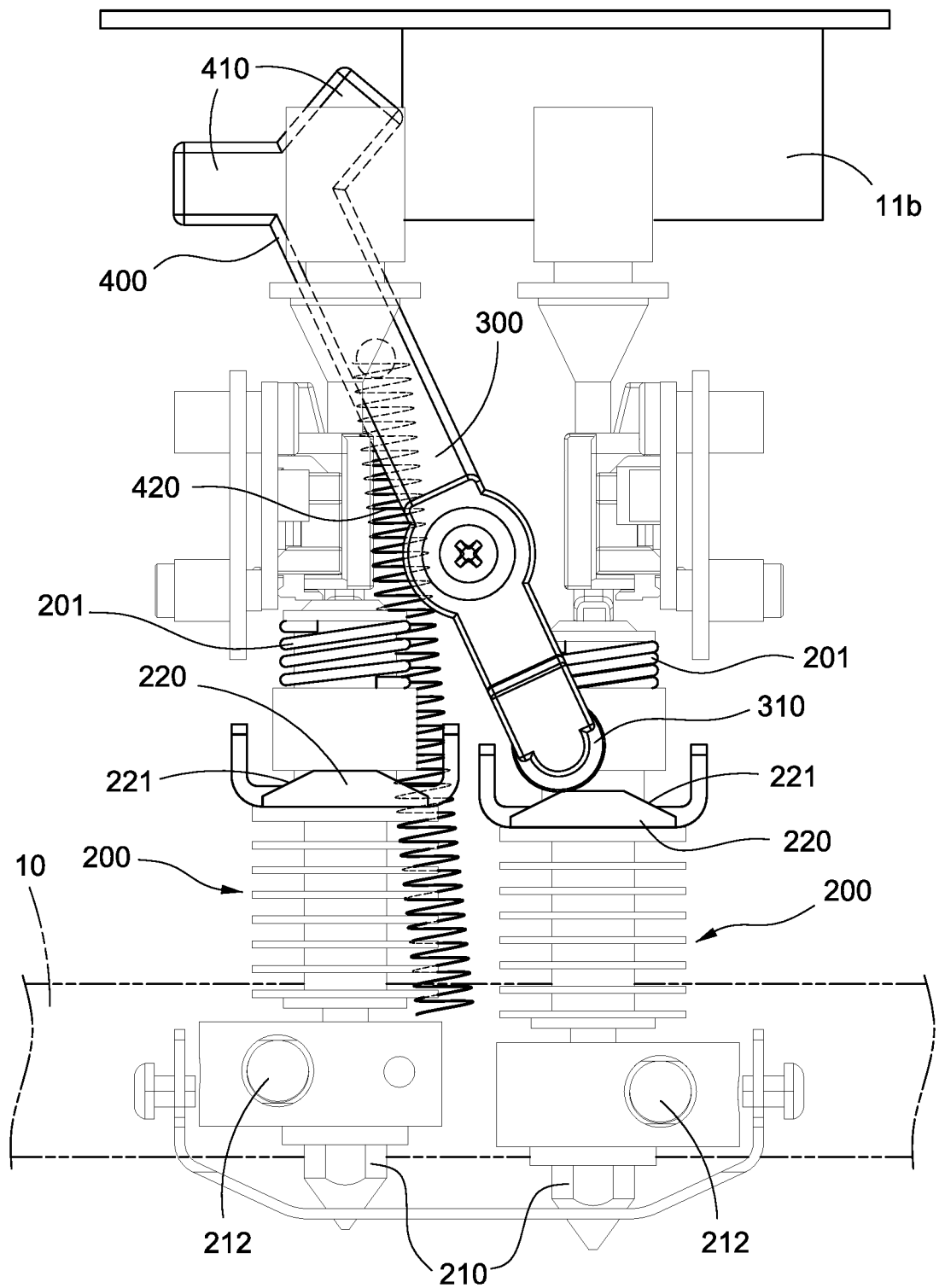

Please refer to FIG. 1, 5 and FIG. 6. In the present embodiment, each of the nozzles 210 is provided with a pressing plate 220 respectively, and an edge of the pressing plate 220 forms a slope surface 221. When the lower end of the swing arm 300 moves from the side of the nozzle 210 to the top surface of the nozzle 210, the slope surface 221 can facilitate the passing of the lower end of the swing arm 300 to move to the corresponding pressure plate 220 to thereby press the corresponding nozzle 210.

Figure 2:
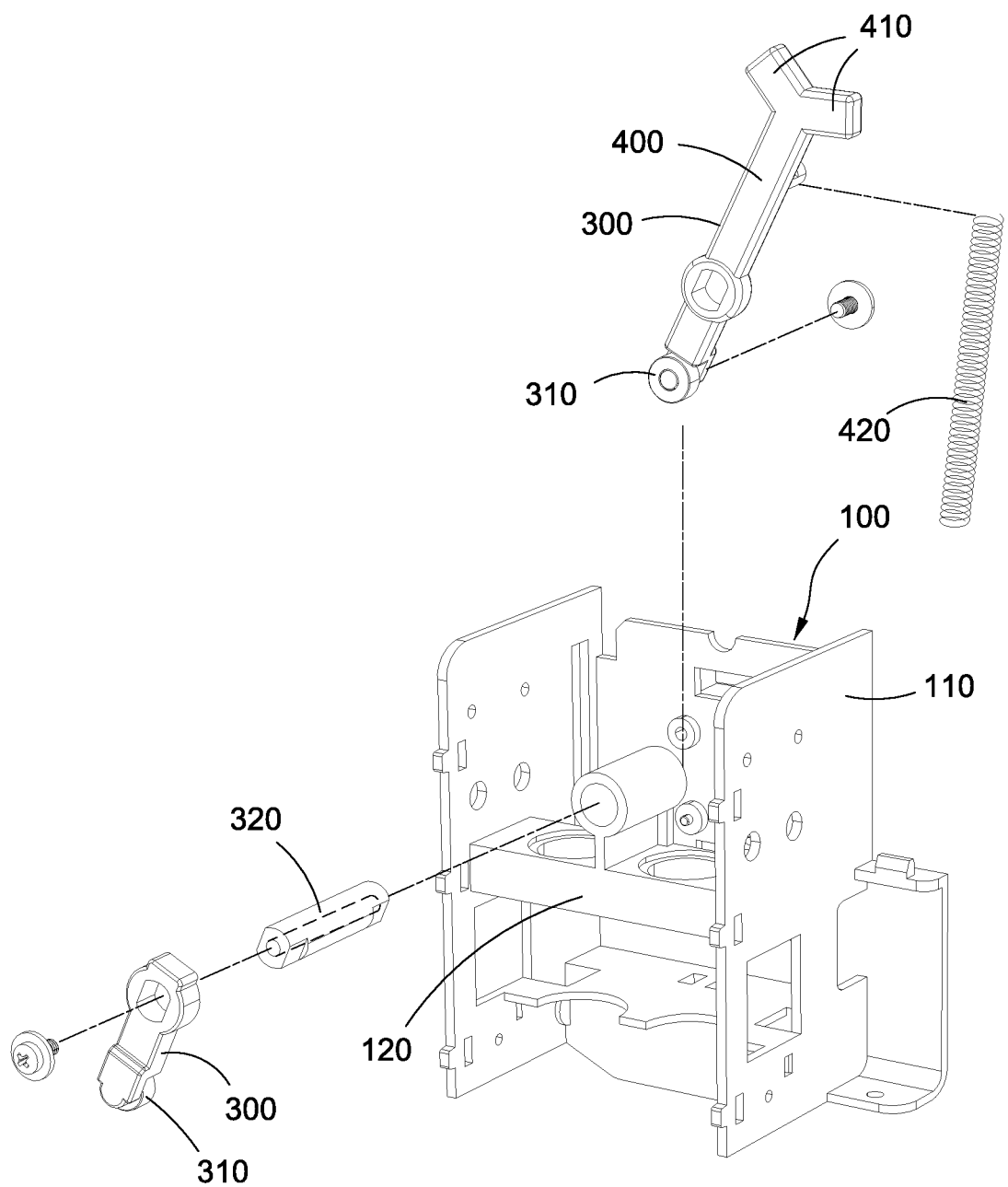
FIG. 2 and FIG. 3 are perspective explosion schematic views illustrating a 3D print head with nozzles capable of raising and lowering according to the present disclosed example.
Figure 3:
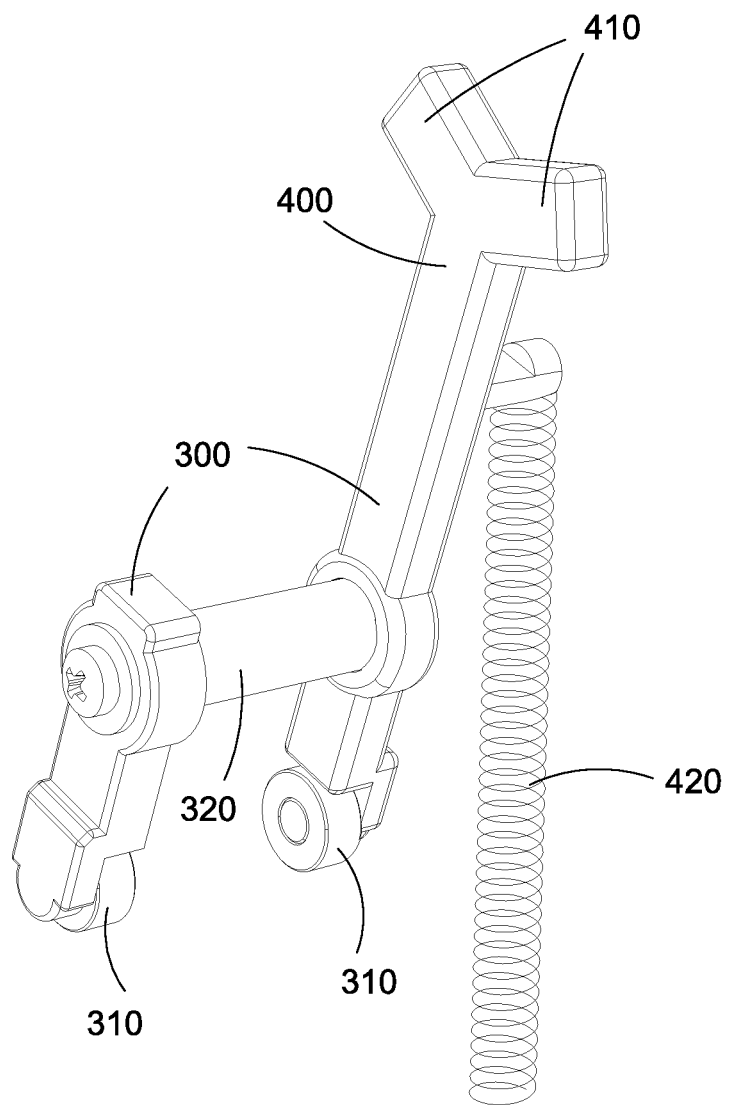

Please refer to FIG. 1 to FIG. 3. In a simplest embodiment, it provides a single swing arm 300 to achieve the effect of pressing the nozzle 210, however, the number of swing arms 300 is not limited. In this embodiment, a pair of swing arms 300 are disposed, and the pair of swing arms 300 are connected to two ends of a linked rotating shaft 320 respectively. The linked rotating shaft 320 runs through the frame 120 and pivoted thereto. The pair of swing arms 300 are coaxially rotated by the linked rotating shaft 320, and the push rod 400 extends from one of the swing arms 300.

Figure 4:
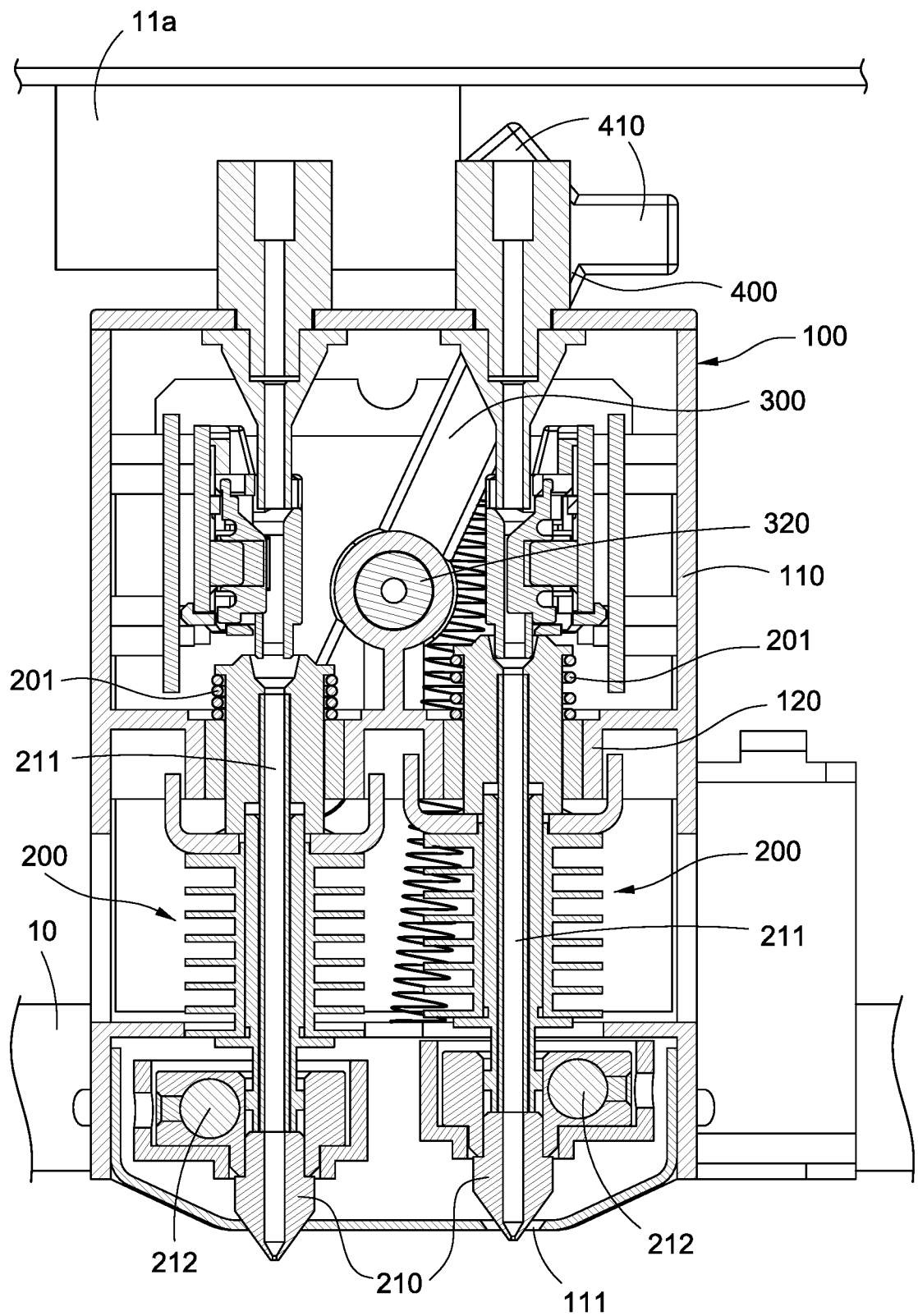
FIG. 4 is across sectional view illustrating a 3D print head with nozzles capable of raising and lowering according to present disclosed example.
Figure 8:
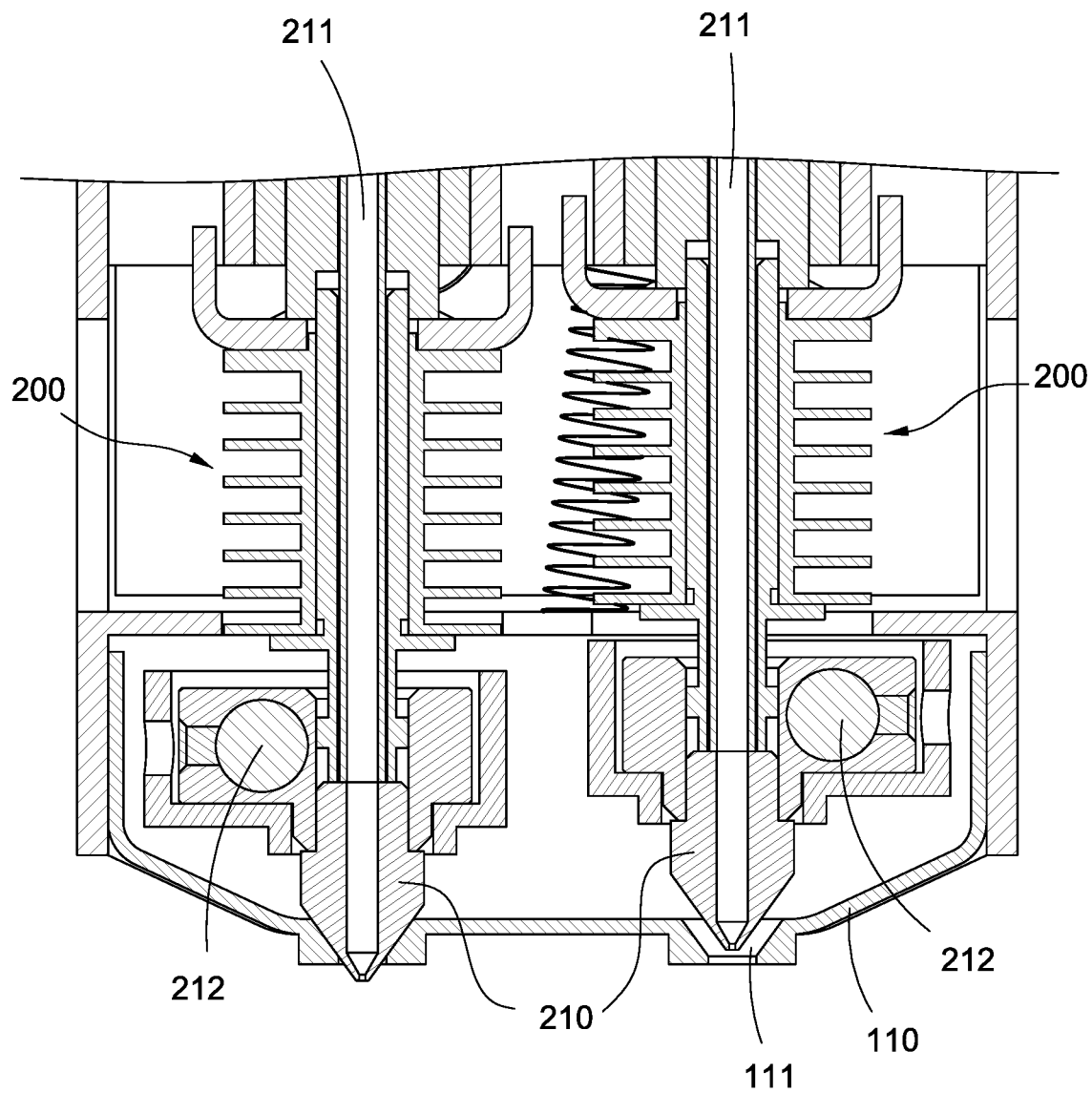
FIG. 8 is another schematic view illustrating the positioning hole in the 3D print head with nozzles capable of raising and lowering according the present disclosed example.

Please refer to FIG. 4. The housing 110 of the carrier 100 can be provided with a positioning hole 111. The housing 110 is exposed through the positioning hole 111 when the nozzle 210 is lowered, and a lower tip of the nozzle 210 is positioned against an inner edge of the positioning hole 111. Thereby, it is possible to avoid lateral offset or sway when the nozzle 210 moves. In the present embodiment, the positioning hole 111 is disposed on the sheet metal member of the housing 110, and the positioning hole 111 is, but not limited to, a through hole or a tapered hole corresponding to the nozzle 210 having a shape tapered downwardly. Please refer to FIG. 8. The positioning hole 111 can also be formed on the plastic member of the housing 110, and thereby a deeper tapered positioning hole 111 may be provided to increase the accuracy of the positioning nozzle 210.

As shown in the figures of the embodiments of the present disclosed example, when the 3D print head moves, the swing arm 300 will be pushed to rotate by the push rod 400 colliding with the interference structure 11a/11b, thereby the nozzle 210 of using will be pushed down for printing. Therefore, the nozzle 210 can be raised or lowered by a simple structure to generate a height difference between the two nozzles 210, so that the finished product will not be scratched by the idle nozzle 210 at the time of printing.

Although the disclosed example has been described with reference to the preferred embodiment thereof, it will be understood that the invention is not limited to the details thereof. Various substitutions and improvements have been suggested in the foregoing description, and others will occur to those of ordinary skill in the art. Therefore, all such substitutions and improvements are intended to be embraced within the scope of the invention as defined in the appended claims.

What is claimed is:

1. A 3D print head comprising:
   interference structures;
   a horizontal slide rail;
   a carrier connected with the horizontal slide rail;
   a pair of nozzle assemblies disposed on the carrier, each of the nozzle assemblies including a nozzle and an elastic member separately; each nozzle assembly being movably coupled to the carrier and capable of raising and lowering with respect to the carrier, and each elastic member being connected between the carrier and the corresponding nozzle, so that the nozzles can be lifted with respect to the carrier respectively;
   a swing arm pivotally connected to the carrier, the swing arm swinging so that one end of the swing arm can be moved between the nozzles and capable of selectively pushing one of the nozzles down; and
   a push rod extending from the swing arm and disposed corresponding to the interference structures;
   wherein, the carrier is movable along the horizontal slide rail such that the push rod is selectively-pushed by one of the interference structures to rotate the swing arm.

2. The 3D print head according to claim 1, wherein a pivot point of the swing arm and the carrier is located between the nozzles.

3. The 3D print head according to claim 1, wherein a positioning elastic member is connected between the swing arm and the carrier, and the positioning elastic member drives the swing arm to press and position one of the nozzles downward.

4. The 3D print head according to claim 3, wherein the positioning elastic member swings with the swing arm, and the positioning elastic member and the carrier have a connection point located between the pair of nozzles.

5. The 3D print head according to claim 1, wherein the carrier includes a housing and a frame accommodated in the housing; the pair of nozzle assemblies are accommodated in the housing and are movably coupled to the frame.

6. The 3D print head according to claim 5, wherein the push rod extends out the housing.

7. The 3D print head according to claim 5, wherein the carrier is provided with positioning holes corresponding to each of the nozzles, and a lower tip of each of the nozzles is capable of being positioned against an inner edge of one of the positioning holes.

8. The 3D print head according to claim 1, wherein each of the nozzles is provided with a pressing plate having an edge forming a sloped surface, and the swing arm can be moved to the corresponding pressing plate by any one of the slopes surfaces to press the corresponding nozzle.

9. The 3D print head according to claim 1, further comprising a further swing arm, wherein the swing arm and further swing arm coaxially rotate with each other, wherein the push rod extends from one of the further swing arm or the swing arm.

10. The 3D print head according to claim 1, wherein a guide wheel is pivoted on one end of the swing arm for selectively pushing one of the nozzles.

11. The 3D print head with according to claim 1, wherein a pair of protruding portions are protruded laterally at two sides of the push rod corresponding to the interference structures.

* * * * *